United States Patent [19]

Yamaki

[11] 4,320,433

[45] Mar. 16, 1982

[54] EARTH-LEAKAGE-CURRENT CIRCUIT BREAKER SYSTEM

[75] Inventor: Shoichi Yamaki, Kawasaki, Japan

[73] Assignee: Fuji Electric Co., Ltd., Tokyo, Japan

[21] Appl. No.: 133,498

[22] Filed: Mar. 21, 1980

[51] Int. Cl.$^3$ .............................................. H02H 3/28
[52] U.S. Cl. .................................. 361/45; 324/117 R
[58] Field of Search ....................... 361/42, 44, 45, 46; 324/117 R, 127; 340/650, 651

[56] References Cited

U.S. PATENT DOCUMENTS

| | | | |
|---|---|---|---|
| 3,708,723 | 1/1973 | Shand et al. | 361/45 X |
| 4,021,729 | 5/1977 | Hudson, Jr. | 340/650 X |
| 4,118,597 | 10/1978 | Proctor et al. | 361/45 X |
| 4,280,162 | 7/1981 | Tanka et al. | 361/45 |

FOREIGN PATENT DOCUMENTS

| | | | |
|---|---|---|---|
| 656326 | 1/1963 | Canada | 361/45 |
| 763576 | 7/1967 | Canada | 324/117 R |
| 2555255 | 6/1977 | Fed. Rep. of Germany | 324/127 |

*Primary Examiner*—Harry E. Moose, Jr.
*Attorney, Agent, or Firm*—Bruce L. Birchard

[57] ABSTRACT

For use in D-C power transmission systems there is provided a circuit breaker system which is responsive to leakage currents to ground to break the circuit from the power source to the D-C transmission lines. A toroidal saturable core surrounds the D-C transmission line feed conductors and carries on such core a primary and a secondary transformer winding. An A-C source is connected to the primary winding in series with one of two field coils in the electromagnetic circuit of an electromagnetically actuated circuit breaker. The other field coil in the electromagnetic circuit of the breaker is connected to the secondary winding on the saturable core.

The two field coils are wound to produce at any instant and with the same current therethrough opposite magnetic effects of the same magnitude, that is, with the core unsaturated, the magnetic effects of the currents flowing through the two field coils cancel each other and the transmission line remains activated by reason of the closure of the breaker which is normally held closed by a permanent magnet included therein. If leakage current rises in either side of the D-C transmission line, saturation of the transformer's toroidal core occurs, the current through the secondary winding and second field coil is reduced, the magnetic effects of the two field coils no longer cancel each other, the net magnetic flux exceeds that of the permanent magnet holding the breaker shut in the absence of leakage current and the breaker opens, de-activating the defective transmission line.

10 Claims, 4 Drawing Figures 4,320,433

EARTH-LEAKAGE-CURRENT CIRCUIT BREAKER SYSTEM

BACKGROUND OF THE INVENTION

1. Field of the Invention

This invention relates to power transmission equipment and, more specifically, to circuit breaking equipment for D-C power transmission systems.

2. Prior Art

In recent years the electrical power industry has shown a significant trend towards shifting from A-C power transmission to D-C power transmission. Such D-C power transmission is done at very high voltage to assure high transmission efficiency. With higher transmission voltages come greater problems of leakage to ground and their associated hazards. In A-C power transmission systems such leakage currents are detected by a zero-phase current transformer, the output of which causes a tripping device to open the contacts of the breaker. Such a circuit obviously will not suffice in a D-C power transmission system. D-C leakage current detection and circuit breaking systems have thus far been unavailable.

It is an object of this invention, therefore, to overcome the general disadvantages set forth hereinbefore.

It is a further object of this invention to provide a leakage current detection and circuit breaking system for protection of D-C power transmission line systems.

SUMMARY OF THE INVENTION

A saturable toroidal coil for a transformer surrounds the conductors to the D-C transmission line to be protected. On that core are wound a primary winding, a secondary winding and a biasing winding. There is also provided a circuit breaker mechanism including a magnetic yoke, an armature and two field coils, one on each leg of the yoke and wound to produce opposing magnetic fluxes in the yoke. A permanent magnet urges the armature towards the yoke, the armature moving with it the line contacts of the breaker. When the armature is in its most proximate position with respect to the yoke the transmission line contacts are closed and the line is activated. One of the field coils receives an A-C current proportional to the current flowing in the primary coil on the toroidal core. The other field coil is connected across the secondary coil and receives an A-C voltage therefrom.

With the core unsaturated, the number of windings in the primary and secondary coils and in the field windings, and the currents therethrough are such as to produce exactly offsetting magnetic fields in the yoke and the permanent magnet keeps the breaker closed. If leakage current exists in the transmission line system the current in the transmission lines is unbalanced inducing a net flux into the saturable core causing its saturation. The secondary voltage applied to one field coil is reduced, the current through it is reduced, the net magnetic flux added to the yoke overcomes the effects of the permanent magnet in the yoke and the armature moves away from the yoke causing the transmission line feeding circuit to open and de-activating the defective transmission line system.

BRIEF DESCRIPTION OF THE DRAWINGS

This invention, both as to its nature and operation, may be best understood by the description which follows, taken in connection with the drawings herein, in which.

DETAILED DESCRIPTION OF THE PREFERRED EMBODIMENTS

Figure 1:
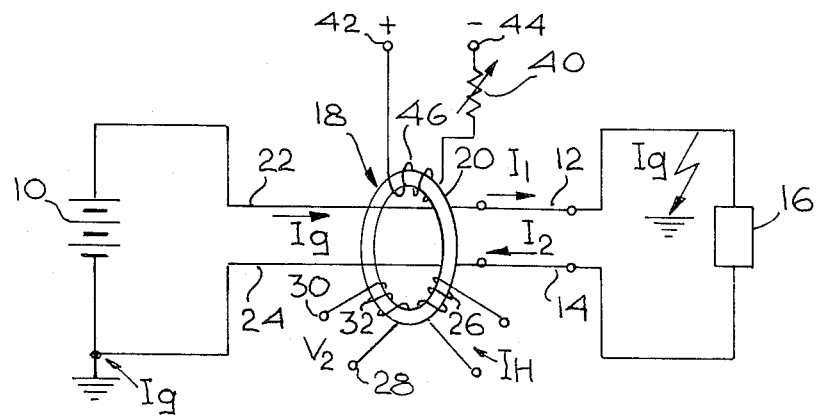
FIG. 1 is a schematic diagram of a leakage-current circuit according to the present invention.

In FIG. 1, D-C power source 10 applies a high potential to conductors 12 and 14 of a transmission line which feeds a load 16. The resulting currents $I_1$ and $I_2$ have the directions shown in FIG. 1, and, in the absence of any ground fault or ground leakage are equal in magnitude.

Figure 2:
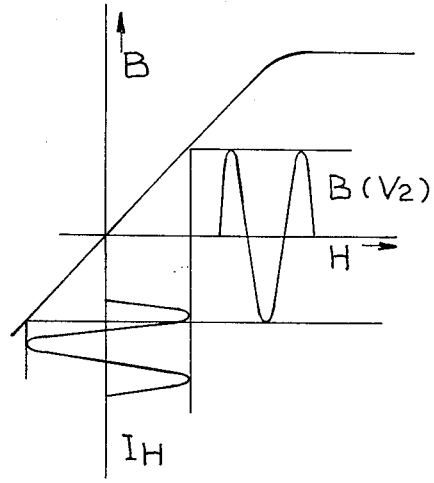
FIG. 2 is a graphical representation of a first set of current-voltages relationships in the circuit of FIG. 1.

A transformer 18 includes a toroidal core 20 of magnetically saturable material such as steel or ceramic ferrite. Core 20 surrounds the conductors 22, 24 feeding transmission lines 12 and 14. When there is no fault or unacceptable leakage from line 12 to ground the current Ig in FIG. 1 may be considered zero in magnitude and currents $I_1$ and $I_2$ are equal and opposite in direction producing a net zero additional field in core 20. Under these conditions the flow of an A-C current $I_H$ through primary coil 26 will produce an A-C voltage V2 at terminals 28, 30 of secondary coil 32. In FIG. 2 this relationship is shown and it is to be noted that the transformer 18 is operating in the linear portion of its B-H curve.

Figure 3:
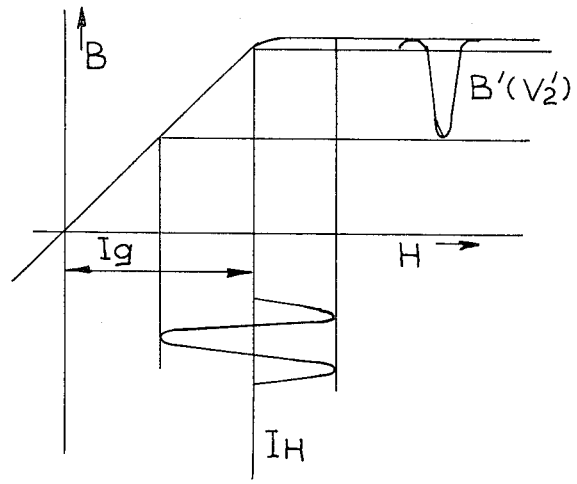
FIG. 3 is a graphical representation of a second set of current-voltage relationships in the circuit of FIG. 1; and, FIG. 4 is a schematic diagram of a leakage current sensing and circuit breaking system for D-C power transmission line systems, according to this invention.

If a fault or leakage current Ig arises, it will appear in conductor 22, the net magnetic effect of the currents flowing in opposite directions in conductors 22 and 24 will not be zero and transformer 18 will no longer be operating in its linear B-H region, as shown in FIG. 3. The result will be a clipping of the sine wave applied to primary 26 and a reduced voltage V2' at terminals 28, 30.

The level of leakage current, Ig, which produces saturation can be adjusted by means of variable resistor 40 which controls the current from terminals 42, 44 to biasing winding 46.

Figure 4:
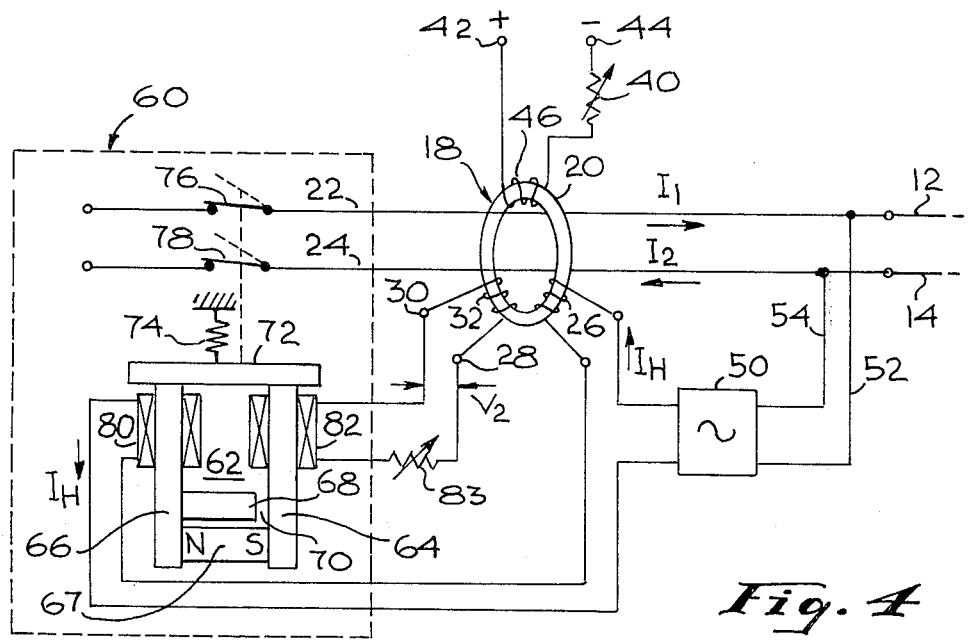

The practical application of this saturable core transformer technique to D-C transmission line protection can be seen in FIG. 4. In FIG. 4, oscillator 50 is powered thru leads 52, 54 from the power circuit including conductors 22, 24, through appropriate voltage dividing means. Oscillator 50 may generate a sine wave at 60 Hz, for example.

Circuit breaker 60 includes yoke 62 having legs 64 and 66, permanent magnet 67 and shunting member 68, which, by reason of gap, 69 adjusts the amount of magnetic flux flowing thru legs 64, 66 into armature 72, and, hence, the amount of magnetic attraction between yoke 62 and armature 72. This force of magnetic attraction is nearly offset by the oppositely directed force of spring 74. In the normal state contacts 76, 78 of circuit breaker 60 are closed.

A field coil 80 is provided on leg 66 and a field coil 82 is provided on leg 68 of yoke 62. These field coils may have the same number of turns but are wound in opposite directions so as to produce opposing magnetic fluxes in yoke 62 and armature 72.

A voltage from oscillator 50 is applied to primary 26 and field coil 80, in series, and a current $I_H$ flows therethrough producing a voltage V2 across terminals 28, 30 of secondary 32 when core 20 is unsaturated, i.e., when no excessive leakage current Ig exists. Rheostat 83 may be provided to assure equal flux generation by coils 80 and 82. When no leakage exists the current $I_1$, $I_2$ are equal and opposite and produce zero additional flux in core 20.

If line 12 develops a fault (a low resistance to ground) the current in conductor 22 will exceed that in conductor 24 and a net additional flux will appear in core 20 causing it to saturate. Upon saturation, the voltage V2 will be decreased, as described in connection with FIG. 1. The reduction in V2 will reduce the current flow through field coil 82 and unbalance the opposing fluxes produced by field coils 80, 82. As a result, the holding of armature 72 by the P-M flux from magnet 66 will be overcome and spring 74 will urge armature 72 away from yoke 62 and switch arms 76, 78 into the open or "dotted-line" position until manually re-set.

Thus, there has been provided a fault or leakage-current-responsive circuit breaker or protection circuit for D-C power transmission circuits.

What is claimed is:

1. A leakage-current-sensitive circuit breaker for a D-C power system having a pair of conductors adapted to carry D-C current in opposite directions, including:
   a toroidal, saturable core ringing said pair of conductors;
   first and second windings about said core;
   a source of alternating current;
   a circuit breaker mechanism including a yoke having first and second legs and magnetic means coupled between said first and second legs for producing magnetic flux in said legs;
   a first field coil wound in a first direction around said first leg and a second field coil would around said second leg in a direction opposite to said first direction;
   a magnetic armature movable from a position in proximity to said yoke to a position remote therefrom;
   a pair of switch arms carried by said yoke and movable from a closed position, when said armature is proximate to said yoke, to an open position, when said armature is remote from said yoke;
   first biasing means for urging said armature away from said yoke;
   said first winding and said first field coil being connected in series across said source of alternating current;
   said second winding being coupled across said second field coil;
   said first and second field coils producing equal and opposite magnetic fields in the absence of leakage current in said power system;
   said core being saturable by a predetermined level of leakage current to cause a reduction in the magnetic field produced by said second field coil, whereby said armature is urged away from said yoke by said first biasing means and said switch arms are moved to an open position.

2. Apparatus according to claim 1 which includes magnetic biasing means for adjusting the level of leakage current in said system which will cause said switch arms to move to an open position.

3. Apparatus according to claim 1 in which said first biasing means is a mechanical spring.

4. Apparatus according to claim 1 in which said magnetic means includes a permanent magnet and a magnetic shunt.

5. Apparatus according to claim 1 in which said core is a ceramic ferrite.

6. Apparatus according to claim 1 in which said first and second field coils have equal numbers of turns.

7. Apparatus according to claim 2 in which said magnetic biasing means includes a third winding on said core.

8. Apparatus according to claim 1 in which said source of alternating current is powered from said D-C power system.

9. Apparatus according to claim 7 which includes, in addition, variable resistor means for adjusting the level of magnetic bias in said core.

10. Apparatus according to claim 1 in which said source of alternating current supplies current at 60 Hz.

* * * * *